United States Patent
Fisher-Jeffes et al.

(10) Patent No.: US 7,665,010 B2
(45) Date of Patent: Feb. 16, 2010

(54) BLIND TRANSPORT FORMAT DETECTION FOR TRANSMISSION LINK

(75) Inventors: Timothy Fisher-Jeffes, Meldreth (GB); Jason Woodard, Cambridge (GB)

(73) Assignee: MediaTek Inc., Hsin-Chu (TW)

( * ) Notice: Subject to any disclaimer, the term of this patent is extended or adjusted under 35 U.S.C. 154(b) by 786 days.

(21) Appl. No.: 10/515,301

(22) PCT Filed: May 20, 2003

(86) PCT No.: PCT/GB03/02174

§ 371 (c)(1),
(2), (4) Date: Dec. 26, 2005

(87) PCT Pub. No.: WO03/101026

PCT Pub. Date: Dec. 4, 2003

(65) Prior Publication Data

US 2006/0117245 A1    Jun. 1, 2006

(30) Foreign Application Priority Data

May 23, 2002   (GB) ................................ 0211844.6

(51) Int. Cl.
H03M 13/03 (2006.01)
G06F 7/02 (2006.01)
G01R 31/28 (2006.01)

(52) U.S. Cl. .................. 714/792; 714/795; 714/821; 714/712

(58) Field of Classification Search ................ 714/712, 714/792, 795, 821
See application file for complete search history.

(56) References Cited

U.S. PATENT DOCUMENTS 7,024,602 B2 *   4/2006  Obuchi et al. ............... 714/712
7,072,926 B2 *   7/2006  Nagata et al. ............... 708/277

(Continued)

FOREIGN PATENT DOCUMENTS

WO     02/060083       8/2002
WO     02/065720       8/2002
WO     WO 03/101026    12/2003

OTHER PUBLICATIONS

Okumura, Y., et al, "Variable-rate data transmission with blind rate detection for coherent DS-CDMA Mobile Radio", IEICE Trans. Commun., vol. E81-B, No. 7, Jul. 1998, pp. 1365-1372.*

(Continued)

*Primary Examiner*—John J Tabone, Jr.
(74) *Attorney, Agent, or Firm*—Fish & Richardson P.C.

(57) ABSTRACT

Receiver-side apparatus for a transmission link, the link using different transport formats for blocks of data, and using convolutional coding with additional error detection code information, for transmitting the blocks to the receiver side, the apparatus having a decoder for performing a trellis decode and tracebacks of one of the received coded blocks, to produce decoded data candidates, an error detection element for carrying out one or more speculative error detections on the candidates, assuming part of each candidate is the additional error detection code, and part is the block of data, and a format detector for determining a transport format based on a result of the speculative error detections, the apparatus being arranged to determine a probability of a candidate being valid, and prioritize carrying out the tracebacks or the speculative error detections according to the probabilities.

12 Claims, 3 Drawing Sheets

U.S. PATENT DOCUMENTS

| | | | |
|---|---|---|---|
| 7,076,005 B2* | 7/2006 | Willenegger | 375/341 |
| 2002/0108090 A1* | 8/2002 | Ariel et al. | 714/792 |
| 2002/0131532 A1* | 9/2002 | Chi et al. | 375/341 |

OTHER PUBLICATIONS

International preliminary examination report PCT/GB03/02174.
International search report from corresponding International Application PCT/GB03/02174, filed May 20, 2003.
British search report from corresponding British Application GB0211844.6, filed May 23, 2002.
Okumura, Y, et al., *Variable-Rate Data Transmission With Blind Rate Detection for Coherent DS-CDMA Mobile Radio*, IEICE Transactions on Communications, vol. E81-B, No. 7, Jul. 1, 1998, odd pages only.
Sohn, Insoo et al., Blind Rate Detection Algorithm in W-CDMA Mobile Receiver, Vehicular Technology Conference 2001, vol. 3, pp. 1589-1592.

\* cited by examiner

* If the value of detected $n_{end}'$ is "0", the received frame data is declared to be in error.

* If the value of detected $n_{end}'$ is "0", the received frame data is declared to be in error.

BLIND TRANSPORT FORMAT DETECTION FOR TRANSMISSION LINK

FIELD OF THE INVENTION

The invention relates to receivers for transmission links, in base stations or mobile terminals of radio transmission links, and to corresponding software and methods, for carrying out blind transport format detection.

BACKGROUND TO THE INVENTION

It is known to provide transport services for data over a transmission link using various telecommunication protocols. One such set of protocols, known as UMTS, is the European proposal for a third generation (3G) cellular network. It is inter-operable with the existing GSM network, and is notable for providing high speed packet-switched data transmission. UMTS transmission protocols are defined in a series of standards developed by the Third Generation Protocol Partnership (3GPP). These standards define a number of layers for the transmissions, broadly in line with the well known ISO seven layer definition. There is a physical layer, L1, a data link layer, L2, and a network layer L3. Layer 2 of this UMTS protocol stack includes procedures for handling data from or to a MAC (Medium Access Control) and higher layers. The data in the form of Transport blocks or sets of Transport blocks is encoded/decoded to offer transport services over a radio transmission link. A channel coding scheme provides a combination of error detection, error correcting, rate matching, interleaving and transport channels mapping onto/splitting from physical channels.

At a receiver, it is necessary to identify a channel format and decode the overhead and payload in the data to enable these functions of the coding scheme to operate. Suitable coding schemes are described in detail in the 3GPP standard 25.212 to which the reader is referred. One of the schemes for the receiver, described in this document, is blind transport format detection (BTFD). This is a scheme for detecting the format of the transport channels and in particular detecting a finish of a block of data for one channel. It makes use of the fact that the block is terminated by an error detection code, in this case a CRC (Cyclic Redundancy Check) code. The scheme uses this to test whether a given sequence of bits in the data stream could be a CRC code, for a block of data bits preceding the CRC bits. For different channel formats, the length of the block may differ. It may be coded in various ways including convolution coding.

Explicit blind transport format detection involves performing the recursive add-compare-select (ACS) process of a trellis decode over the maximum Transport Format (TF) length, storing trace-back information as one goes. This is followed by a series of speculative trace-backs and subsequent CRC checks starting from each position where a potential transport format could have terminated. This is summarised in FIGS. 1, 2 and 3. When a CRC pass is found the resulting decoded sequence has a high probability of being the correct one of the correct length and hence also the correct transport format. This implies the need for a convolutional coded data sequence that has a CRC appended to it prior to encoding. The series of tracebacks and subsequent CRC checks are carried out in order of the shortest tracebacks first.

SUMMARY OF THE INVENTION

It is an object of the invention to provide an improved blind transport format detection method or apparatus for the same.

A first aspect of the invention provides a receiver for a transmission link, the link using different transport formats for blocks of data, and using convolutional coding with additional error detection code information, for transmitting the blocks to the receiver, the receiver having:

a decoder for performing a trellis decode and tracebacks of one of the received coded blocks, to produce decoded data candidates, an error detection element for carrying out one or more speculative error-detections on the candidates, assuming part of each candidate is the additional error detection code, and part is the block of data, and a format detector for determining a transport format based on a result of the speculative error detections, the receiver being arranged to determine a probability of a candidate being valid, and prioritise carrying out the tracebacks or the speculative error detections according to the probabilities.

By prioritising according to probability, rather than according to length of traceback, a valid candidate is likely to be found more quickly, and thus the transport format is likely to be found more quickly. Also, in many applications there is no need to continue once a valid candidate is found. Hence the number of unnecessary calculations involved in tracebacks and error detections can be reduced. This is significant, since tracebacks and CRC error detection calculations are relatively computationally intensive. This is particularly valuable commercially for receivers in mobile equipment for radio links, such as handsets for cellular networks, where calculation uses power and power consumption limits battery life.

The prioritisation may be of both the traceback and the error detection. It may be used at a base station receiver or a mobile receiver. The trellis decode is preferably carried out over a maximum length of a block. Preferably the error detection code is a CRC code. Preferably there is a limit to the number of speculative tracebacks and error detections carried out, after which a false detection event is indicated. Preferably the probability is determined from a comparison of the all zero state metric with other metrics at the same point in the trellis. Preferably the link uses fixed transport channel start points. Preferably the receiver is UMTS 3GPP compliant equipment.

According to other aspects, there is provided a corresponding base station, and corresponding methods and software. Other advantages will be apparent to those skilled in the art. Preferred features may be combined with other aspects of the invention.

BRIEF DESCRIPTION OF THE DRAWINGS

Embodiments will now be described by way of example with reference to the drawings in which.

DETAILED DESCRIPTION

Figure 1:
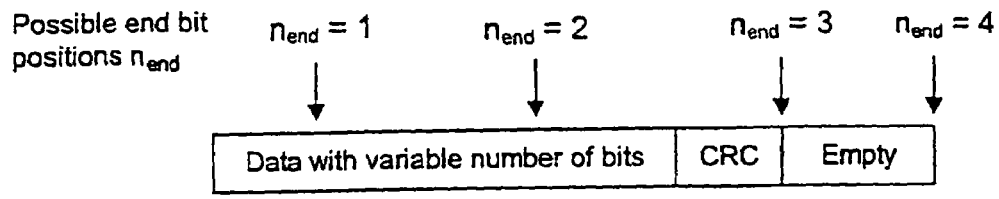
FIG. 1 shows a known arrangement of a data stream having transport channels in blocks.
Figure 2:
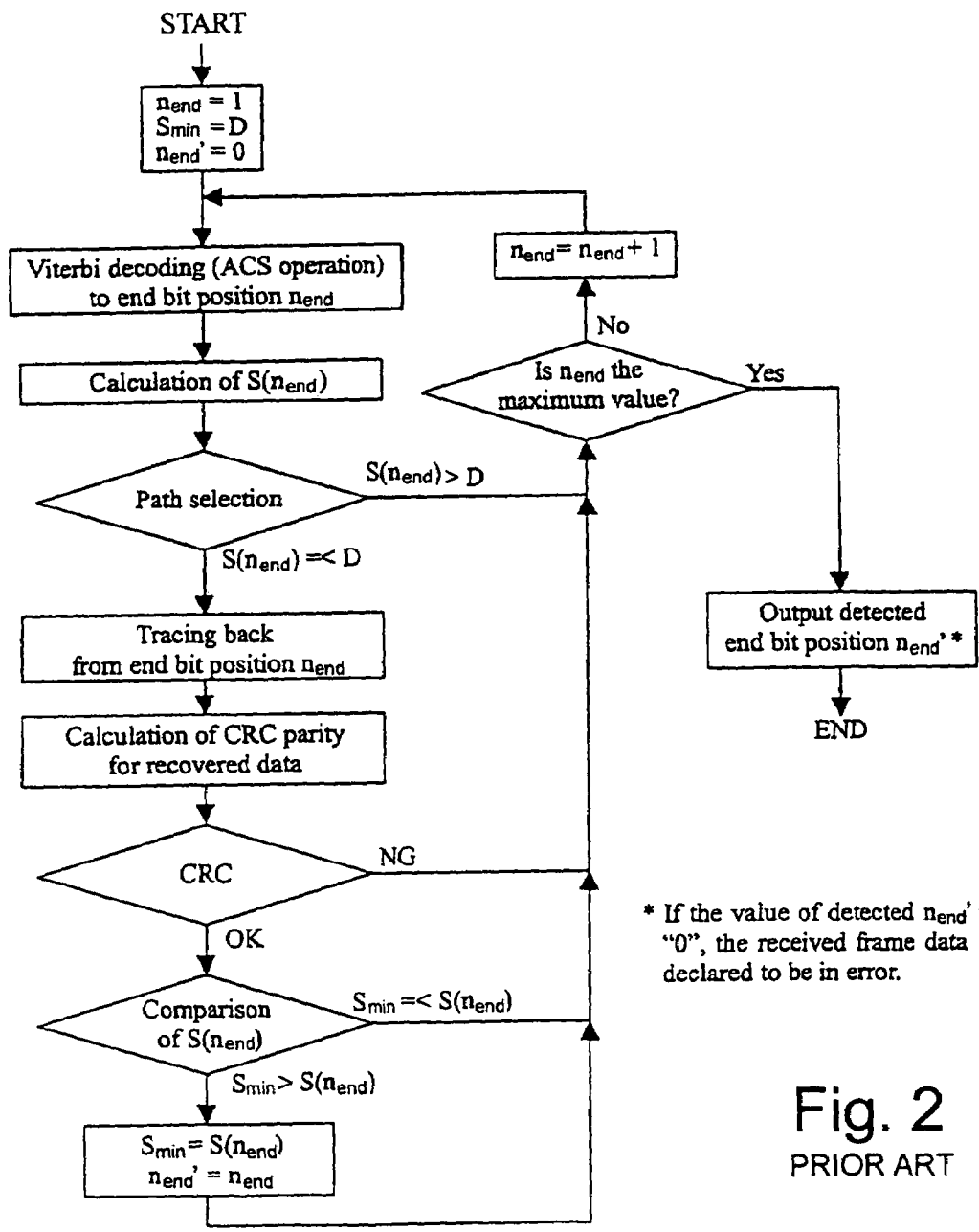
FIG. 2 shows a flow chart of a known procedure for BTFD.

For ease of explanation of the embodiments of the invention, the implementation of BTFD known from the above referenced 3GPP standard will be described in more detail with reference to FIGS. 1 and 2. Yet further details are set out in the standard.

At the transmitter, the data stream with variable number of bits from higher layers is block-encoded using a cyclic redundancy check (CRC) and then convolutionally encoded. CRC parity bits are attached just after the data stream with variable number of bits as shown in FIG. 1. The size of the CRC is 24, 16, 12, 8 or 0 bits and it is signalled from higher layers what CRC size that should be used for each channel. Convolutional codes with constraint length 9 and coding rates ⅓ and ½ are defined.

The receiver knows only the possible transport formats (or the possible end bit position $\{n_{end}\}$) by Layer-3 negotiation. The receiver performs Viterbi-decoding on the soft decision sample sequence. The correct trellis path of the Viterbi-decoder ends at the zero state at the correct end bit position. The blind transport format detection method using CRC traces back the surviving trellis path ending at the zero state (hypothetical trellis path) at each possible end bit position to recover the data sequence. For each recovered data sequence error-detection is performed by checking the CRC, and if there is no error, the recovered sequence is declared to be correct.

The following variable is defined:

$$s(n_{end}) = -10\log_{10}\left(\frac{a_0(n_{end}) - a_{\min}(n_{end})}{a_{\max}(n_{end}) - a_{\min}(n_{end})}\right)[dB] \quad \text{Equation (1)}$$

where $n_{end}$ is the current bit position within the trellis (the potential transport format end position). $\alpha_l(k)$ is the surviving trellis metric of the l-th state at the k-th position in the trellis and hence $\alpha_0(n_{end})$ is the surviving trellis metric of the zeroth-state at the $n_{end}$-th position in the trellis, $\alpha_{min}(n_{end})$ is the minimum surviving trellis metric over all states at the $n_{end}$-th position in the trellis and $\alpha_{max}(n_{end})$ is the maximum surviving trellis metric over all states at the $n_{end}$-th position in the trellis. In order to reduce the probability of false detection (this happens if the selected path is wrong but the CRC misses the error detection), a path selection threshold D is introduced. The threshold D determines whether the hypothetical trellis path connected to the zero state should be traced back or not at each end bit position $n_{end}$. If the hypothetical trellis path connected to the zero state that satisfies:

$$s(n_{end}) \leq D \quad \text{Equation (2)}$$

is found, the path is traced back to recover the frame data, where D is the path selection threshold and a design parameter. If more than one end bit positions satisfying Eq. 2 is found, the end bit position which has minimum value of $s(n_{end})$ is declared to be correct. If no path satisfying Eq. 2 is found even after all possible end bit positions have been exhausted, the received frame data is declared to be in error.

Figure 3:
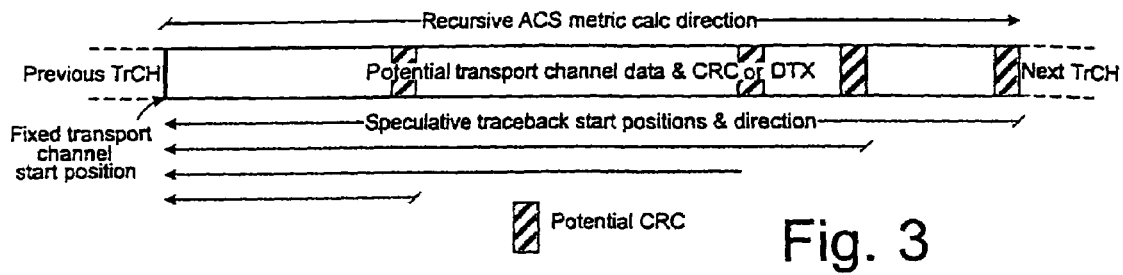
FIG. 3 shows another data block, with a summary of the known BTFD process.

FIG. 3 shows a potential transport channel block of data having CRC information, and preceded and succeded by other blocks in a data stream. The channel or block start position is fixed. Potential CRC positions are shown depending on the transport format. Speculative traceback start positions are shown at each potential CRC position. Recursive ACS metric calculation is carried out in a forward direction, while the tracebacks occur in the reverse direction.

The 3GPP standard sets out that for the uplink, blind transport format detection is a network controlled option. For the downlink, the receiver shall be capable of performing blind transport format detection, if certain restrictions on the configured transport channels are fulfilled:

only one CCTrCH (Coded Composite Transport Channel) is received;

the number of CCTrCH bits received per radio frame is 600 or less;

the number of transport format combinations of the CCTrCH is 64 or less;

fixed positions of the transport channels is used on the CCTrCH to be detectable;

convolutional coding is used on all explicitly detectable TrCHs;

CRC with non-zero length is appended to all transport blocks on all explicitly detectable TrCHs;

at least one transport block shall be transmitted per TTI (Transmission Time Interval) on each explicitly detectable TrCH;

the number of explicitly detectable TrCHs is 3 or less;

for all explicitly detectable TrCHs i, the number of code blocks in one TTI ($C_i$) shall not exceed 1;

the sum of the transport format set sizes of all explicitly detectable TrCHs, is 16 or less. The transport format set size is defined as the number of transport formats within the transport format set;

there is at least one TrCH that can be used as the guiding transport channel for all transport channels using guided detection.

The reason equation 1 is useful is that convolutional codes are generally terminated codes which means that after the encoding process has completed the state within the encoder must have been brought back to the all zero state. Hence, by looking at the size of the all zero state metric compared to the other metrics at the same point in the trellis one can get a good indication of the probability that the corresponding decoder was brought to the all zero state at that point. This in turn could signify a potential end of transport format position.

The reason for the need to improve the probability of false detection is that checking CRC words alone will only produce a probability of false detection of the order of FDR≈$2^{-n}$ where n is the CRC word length. For example in the 3GPP conformance testing specifications a False transmit format Detection Ratio (FDR) of $10^{-4}$ is specified for tests involving BTFD with a CRC length of n=12, giving an FDR based solely on CRC checks of ≈$2 \times 10^{-4}$. This clearly implies the need for at least a five-fold improvement on decoding followed by a CRC check to achieve the required performance. It is unlikely, however, that $s(n_{end})$ is needed to be calculated in dB's and a linear ratio will suffice.

Figure 4:
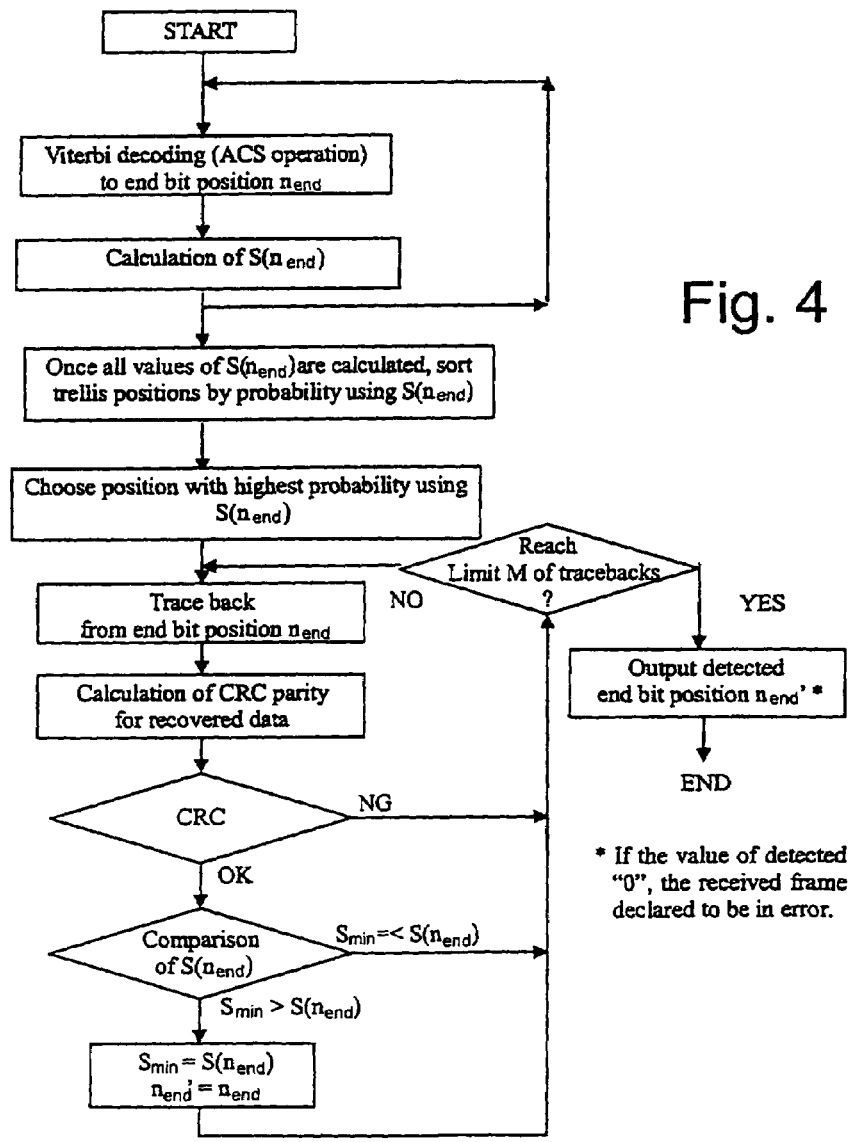
FIG. 4 shows a procedure for blind transport format detection, according to an embodiment of the invention.
Figure 5:
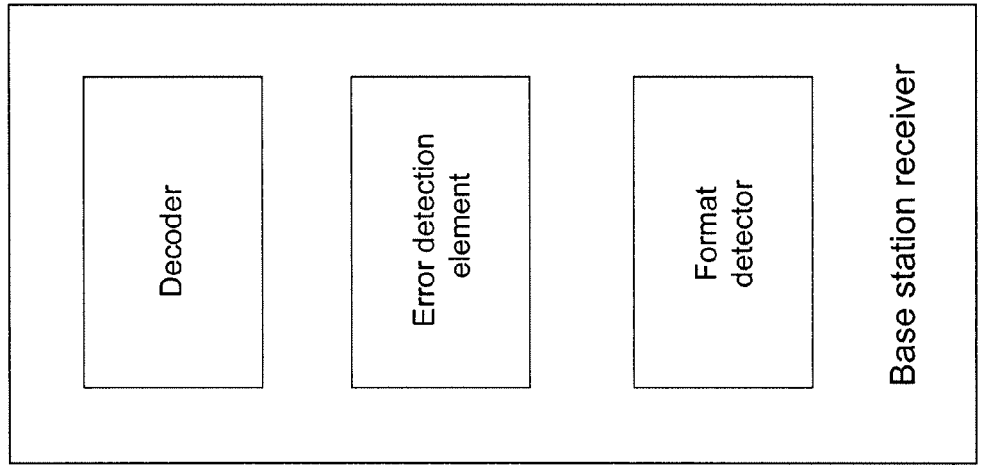
FIG. 5 shows block diagrams of a mobile receiver and a base station receiver.
Figure 5:
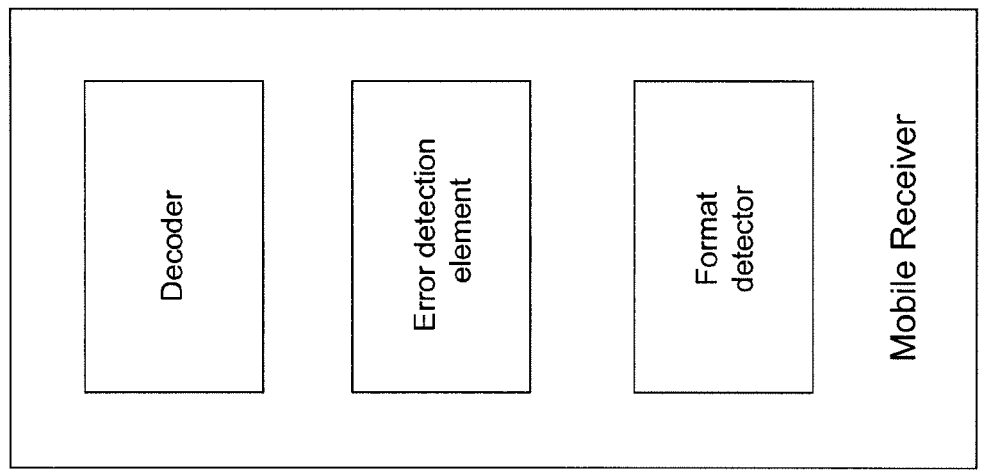

The embodiment of the invention set out in FIG. 4 uses these probabilistic measures $s(n_{end})$ to pick the most likely trellis positions (and hence transport formats) to traceback and CRC check first. Essentially this involves sorting all the probabilistic measures $s(n_{end})$ and doing speculative tracebacks and CRC checks in this order. This will assist explicit BTFD using CRC checking by narrowing down which transport formats for a particular transport channel are most likely under detection before having to actually do any of the tracebacks followed by CRC checks.

This is a change of the algorithm proposed in the above referenced 3GPP standard that suggests speculating TFs to check in order of smallest to the largest. Doing the speculating in a probabilistic order rather than smallest to the largest can improve the power consumption since it reduces the number of unnecessary TFs to try.

There is the further possibility of reducing the number of tracebacks and CRC checks to perform by picking speculative transport formats corresponding to the m largest probabilistic measures rather than all of them. Depending on signal-to-noise ratio and channel quality m may vary. In a typical application m=3 should provide sufficient coverage for this. If none of the top m transport formats pass their CRC then BTFD ends with a false detention event. This will again save on both power and latency in performing BTFD.

The invention claimed is:

1. A receiver-side apparatus for a transmission link, the transmission link using different transport formats for blocks of data, and using convolutional coding with additional error detection code information, for transmitting the blocks of data to the receiver side, the apparatus having:
    a decoder for performing a trellis decode and tracebacks of one of received coded blocks of data to produce decoded data candidates,
    an error detection element for carrying out one or more speculative error detections on the candidates, assuming part of each candidate is the additional error detection code information, and part is the block of data, and
    a format detector for determining a transport format based on a result of the speculative error detections,
    the apparatus being arranged to determine a probability of a candidate being valid, and prioritize carrying out the tracebacks or the one or more speculative error detections according to the probabilities.

2. The apparatus of claim 1 arranged to prioritize both the traceback and the one or more speculative error detections.

3. The apparatus of claim 1 or 2, the trellis decode being carried out over a maximum length of a block.

4. The apparatus of claim 1 or 2, the additional error detection code information being a CRC code.

5. The apparatus of claim 1 or 2, arranged to limit a number of tracebacks and error detections carried out, after which a false detection event is indicated.

6. The apparatus of claim 1 or 2, the probability being determined from a comparison of an all zero state metric with other metrics at a same point in the trellis.

7. The apparatus of claim 1 or 2, the data blocks having fixed transport channel start points.

8. The apparatus of claim 1 or 2, being UMTS 3GPP compliant equipment.

9. The apparatus of claim 1 or claim 2 wherein each of the decoder, error detection element and format detector comprise a processor executing software instructions to perform as recited.

10. A mobile terminal for use with a radio base station, having:
    the receiver-side apparatus as in claims 1 or 2.

11. A base station having the receiver-side apparatus as claims 1 or 2.

12. A method of receiving data over a transmission link, the transmission link using different transport formats for blocks of data, and using convolutional coding with additional error detection code information, for transmitting the blocks of data to the receiver side, the method having the steps of:
    performing a trellis decode and tracebacks of one of the received coded blocks, to produce decoded data candidates,
    carrying out one or more speculative error detections on the candidates, assuming part of each candidate is the additional error detection code information, and part is the block of data, and
    determining a transport format based on a result of the speculative error detections,
    determining a probability of a candidate being valid, and prioritizing the tracebacks or the one or more speculative error detections according to the probabilities.

* * * * *

UNITED STATES PATENT AND TRADEMARK OFFICE
CERTIFICATE OF CORRECTION

PATENT NO.         : 7,665,010 B2
APPLICATION NO.    : 10/515301
DATED              : February 16, 2010
INVENTOR(S)        : Timothy Perrin Fisher-Jeffes It is certified that error appears in the above-identified patent and that said Letters Patent is hereby corrected as shown below:

Column 6, Line 15, in Claim 11, after "as" insert -- in --.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,665,010 B2 |
| APPLICATION NO. | : 10/515301 |
| DATED | : February 16, 2010 |
| INVENTOR(S) | : Timothy Fisher-Jeffes et al. |

Page 1 of 1

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 786 days.

should read (*) Notice: Subject to any disclaimer, the term of this patent is extended or adjusted under 35 U.S.C. 154(b) by 1,056 days.

Signed and Sealed this

Thirty-first Day of August, 2010

David J. Kappos
*Director of the United States Patent and Trademark Office*